United States Patent
Guilani et al.

(10) Patent No.: US 10,294,079 B2
(45) Date of Patent: May 21, 2019

(54) IDLER OR DEFLECTOR SHEAVE FOR ELEVATOR SYSTEM

(71) Applicant: OTIS ELEVATOR COMPANY, Farmington, CT (US)

(72) Inventors: Brad Guilani, Woodstock Valley, CT (US); Amir Lotfi, South Windsor, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 11 days.

(21) Appl. No.: 15/037,561

(22) PCT Filed: Nov. 22, 2013

(86) PCT No.: PCT/US2013/071435
§ 371 (c)(1),
(2) Date: May 18, 2016

(87) PCT Pub. No.: WO2015/076822
PCT Pub. Date: May 28, 2015

(65) Prior Publication Data
US 2016/0304321 A1  Oct. 20, 2016

(51) Int. Cl.
*B66B 7/06* (2006.01)
*B66B 9/00* (2006.01)
(Continued)

(52) U.S. Cl.
CPC ............ *B66B 15/04* (2013.01); *B66B 9/00* (2013.01); *B66B 15/02* (2013.01); *F16H 55/32* (2013.01); *B66B 7/062* (2013.01)

(58) Field of Classification Search
CPC ....... B66B 15/04; B66B 11/008; B66B 15/02; F16H 2055/325; F16H 55/32
See application file for complete search history.

(56) References Cited

U.S. PATENT DOCUMENTS

| 3,140,621 A * | 7/1964 | Stone | F16H 55/36 |
| | | | 198/835 |
| 6,371,448 B1 * | 4/2002 | De Angelis | F16H 55/50 |
| | | | 254/374 |

(Continued)

FOREIGN PATENT DOCUMENTS

| CN | 1572705 A | 2/2005 |
| CN | 1935616 A | 3/2007 |

(Continued)

OTHER PUBLICATIONS

Notification of Transmittal of the International Search Report and the Written Opinion of the International Searching Authority, or the Declaration; Application No. PCT/US2013/071435; dated Aug. 21, 2014; 13 pages.

(Continued)

*Primary Examiner* — Diem M Tran
(74) *Attorney, Agent, or Firm* — Cantor Colburn LLP

(57) ABSTRACT

An elevator system includes an elevator car, a motor, and traction sheave operably connected to the motor to drive rotation of the traction sheave. A belt is operably connected to the elevator car and in frictional contact with the traction sheave to urge movement of the elevator car. One or more deflector sheaves are located between the traction sheave and the elevator car over which the belt is routed to guide the belt to the elevator car. The one or more deflector sheaves include an outer sheave surface having a distance from a sheave axis that varies along a width of the traction sheave. The outer surface includes a first portion having a first coefficient of friction and a second portion having a second coefficient of friction less than the first coefficient of friction, the first portion guiding an elevator belt toward a lateral center of the outer surface.

16 Claims, 7 Drawing Sheets

(51) Int. Cl.
   *B66B 15/02*   (2006.01)
   *B66B 15/04*   (2006.01)
   *F16H 55/32*   (2006.01)

(56) References Cited

U.S. PATENT DOCUMENTS

| | | | |
|---|---|---|---|
| 9,771,244 B2* | 9/2017 | Lehtinen | B66B 7/1215 |
| 2003/0025109 A1* | 2/2003 | Baranda | F16H 55/50 |
| | | | 254/266 |
| 2004/0256180 A1* | 12/2004 | Eichhorn | B66B 15/04 |
| | | | 187/254 |
| 2007/0062762 A1 | 3/2007 | Ach | |
| 2008/0223665 A1* | 9/2008 | O'Donnell | B66B 7/062 |
| | | | 187/256 |
| 2008/0289912 A1 | 11/2008 | Perron | |
| 2011/0114908 A1* | 5/2011 | Fargo | B66B 15/04 |
| | | | 254/390 |
| 2013/0292211 A1* | 11/2013 | Polak | B66B 15/04 |
| | | | 187/254 |
| 2016/0039640 A1* | 2/2016 | Martin | B66B 15/04 |
| | | | 187/254 |

FOREIGN PATENT DOCUMENTS

| | | |
|---|---|---|
| CN | 101365643 A | 2/2009 |
| CN | 201228189 Y | 4/2009 |
| CN | 101497413 A | 8/2009 |
| CN | 102084017 A | 6/2011 |
| CN | 102892702 A | 1/2013 |
| CN | 1105209366 A | 12/2015 |
| EP | 2969876 A1 | 1/2016 |
| JP | 05157155 A | 6/1993 |
| JP | 2005008415 | 1/2005 |

OTHER PUBLICATIONS

European Search Report Issued in EP Application No. 13897759.0, dated Jul. 17, 2017, 12 Pages.
Chinese Office Action Issued in CN Application No. 201380081992.9, dated Feb. 11, 2018, 7 Pages.

* cited by examiner

IDLER OR DEFLECTOR SHEAVE FOR ELEVATOR SYSTEM

BACKGROUND

The subject matter disclosed herein relates to elevator systems driven by coated steel belts. More specifically, the subject disclosure relates to sheave configurations for elevator systems driven by coated steel belts.

Elevator systems utilize coated steel belts operably connected to an elevator car, and driven by a motor to propel the elevator car along a hoistway. Coated steel belts in particular include a plurality of wires located at least partially within a jacket material. The plurality of wires is often arranged into one or more strands and the strands are then arranged into one or more cords. In an exemplary belt construction, a plurality of cords is typically arranged equally spaced within a jacket in a longitudinal direction.

The motor drives a sheave, in this case a traction sheave, over which the coated steel belt is routed. The belt gains traction at the traction sheave, such that rotation of the traction sheave consequently drives movement of the elevator car. The coated steel belt is then routed over one or more idler or deflector sheaves to guide the belt between the traction sheave and the elevator car. It is desired for the belt to travel, or track, over a center portion of the deflector sheave to evenly distribute tension in the belt cords and to prevent cords, especially end cords, of the belt from going into compression and buckling. One method to center the belt on the deflector sheave is to incorporate a crown into the sheave surface geometry. A further requirement for the deflector sheave, however, is a low surface coefficient of friction in order reduce sticking or slipping of the belt over the deflector sheave and thereby reducing associated noise. If the deflector sheave coefficient of friction is too low, however, the belt will not have enough lateral traction to climb and remain at the crown.

BRIEF DESCRIPTION

In one embodiment, a deflector sheave for an elevator system includes an outer sheave surface having a distance from a sheave axis that varies along a width of the traction sheave. The outer surface includes a first portion having a first coefficient of friction and one or more second portions having a second coefficient of friction less than the first coefficient of friction, the first portion guiding an elevator belt toward a lateral center of the outer surface.

Additionally or alternatively in this or other embodiments, the first portion is positioned at a center area of the outer sheave surface relative to the width of the deflector sheave.

Additionally or alternatively in this or other embodiments, the first portion comprises about 25% to 50% of the width of the traction deflector.

Additionally or alternatively in this or other embodiments, the first coefficient of friction of the first portion is defined by an abrasive blast applied to the first portion.

Additionally or alternatively in this or other embodiments, the second coefficient of friction of the one or more second portions is defined by masking the one or more second portions during the abrasive blast operation.

Additionally or alternatively in this or other embodiments, the first coefficient of friction of the first portion is defined by a coating applied to the first portion.

Additionally or alternatively in this or other embodiments, the one or more second portions are two second portions.

Additionally or alternatively in this or other embodiments, each second portion comprises about 25% to 40% of the width of the deflector sheave.

Additionally or alternatively in this or other embodiments, the second coefficient of friction of the one or more second portions is defined by a coating applied to the one or more second portions.

Additionally or alternatively in this or other embodiments, the first coefficient of friction is defined by masking the first portion while applying the coating to the one or more second portions.

Additionally or alternatively in this or other embodiments, the coating is a Teflon nickel coating.

Additionally or alternatively in this or other embodiments, the first portion and the one or more second portions are formed by machined grooves in the outer surface of the deflector sheave.

Additionally or alternatively in this or other embodiments, the outer sheave surface has a spherical crown.

Additionally or alternatively in this or other embodiments, the spherical crown has a radius of between 250 mm and 1000 mm.

Additionally or alternatively in this or other embodiments, the first coefficient of friction is greater than or equal to 0.1.

In another embodiment, an elevator system includes an elevator car, a motor, and traction sheave operably connected to the motor to drive rotation of the traction sheave. A belt is operably connected to the elevator car and is in frictional contact with the traction sheave such that rotation of the traction sheave urges movement of the elevator car. One or more deflector sheaves are located between the traction sheave and the elevator car over which the belt is routed to guide the belt to the elevator car. The one or more deflector sheaves include an outer sheave surface having a distance from a sheave axis that varies along a width of the traction sheave. The outer surface includes a first portion having a first coefficient of friction and one or more second portions having a second coefficient of friction less than the first coefficient of friction, the first portion guiding an elevator belt toward a lateral center of the outer surface.

Additionally or alternatively in this or other embodiments, the first portion is positioned at a center area of the outer sheave surface relative to the width of the deflector sheave.

Additionally or alternatively in this or other embodiments, the first portion comprises about 25% to 50% of the width of the traction deflector.

Additionally or alternatively in this or other embodiments, the first coefficient of friction of the first portion is defined by an abrasive blast applied to the first portion.

Additionally or alternatively in this or other embodiments, the second coefficient of friction of the one or more second portions is defined by masking the one or more second portions during the abrasive blast operation.

Additionally or alternatively in this or other embodiments, the first coefficient of friction of the first portion is defined by a coating applied to the first portion.

Additionally or alternatively in this or other embodiments, the one or more second portions are two second portions.

Additionally or alternatively in this or other embodiments, each second portion comprises about 25% to 40% of the width of the deflector sheave.

Additionally or alternatively in this or other embodiments, the second coefficient of friction of the one or more second portions is defined by a coating applied to the one or more second portions.

Additionally or alternatively in this or other embodiments, the first coefficient of friction is defined by masking the first portion while applying the coating to the one or more second portions.

Additionally or alternatively in this or other embodiments, the coating is a Teflon nickel coating.

Additionally or alternatively in this or other embodiments, the first portion and the one or more second portions are formed by machined grooves in the outer surface of the deflector sheave.

Additionally or alternatively in this or other embodiments, the outer sheave surface has a spherical crown.

Additionally or alternatively in this or other embodiments, the spherical crown has a radius of between 250 mm and 1000 mm.

Additionally or alternatively in this or other embodiments, the first coefficient of friction is greater than or equal to 0.1.

The detailed description explains the invention, together with advantages and features, by way of examples with reference to the drawings.

DETAILED DESCRIPTION

Figure 1A:
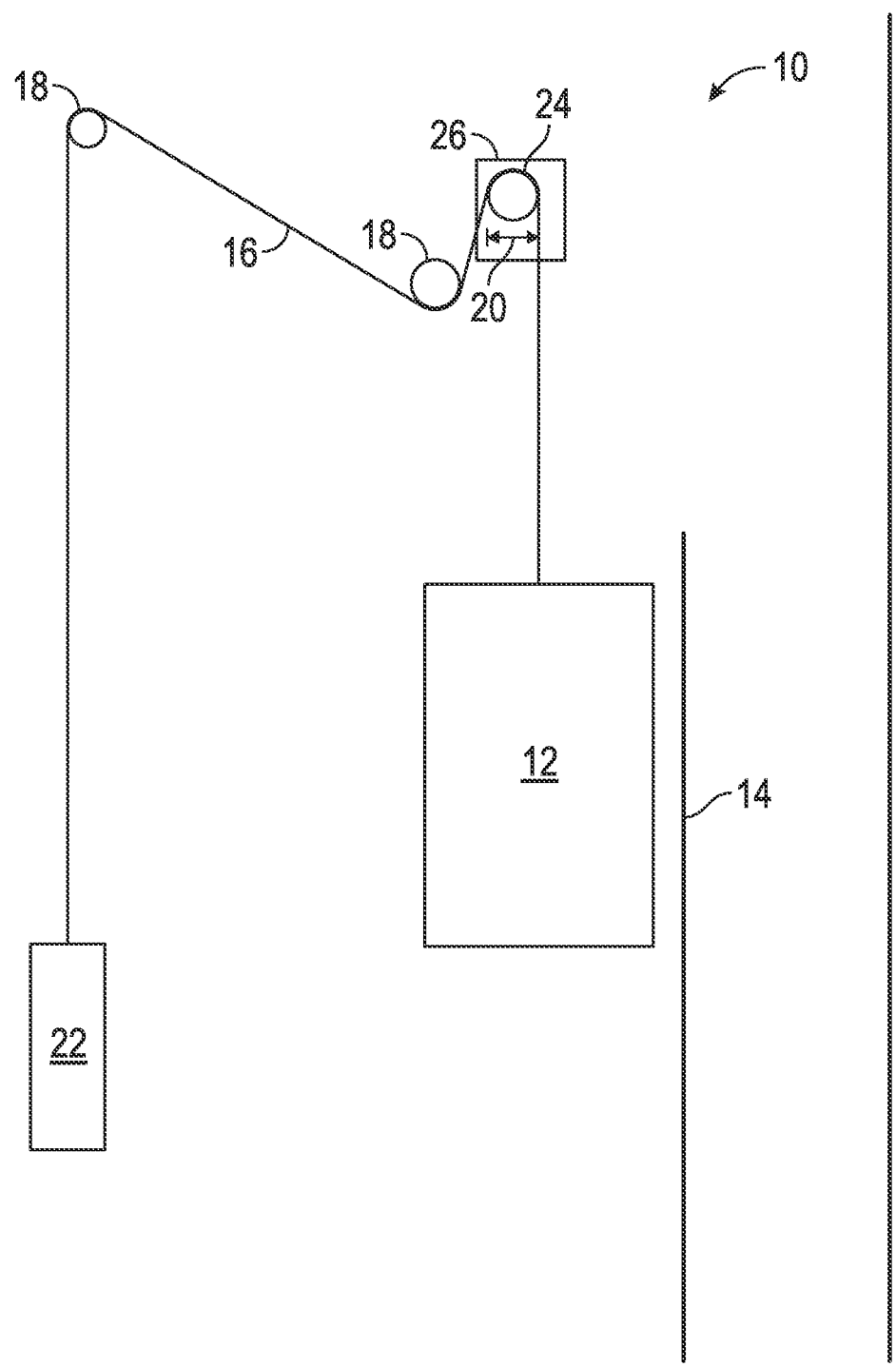
FIG. 1A is a schematic of an exemplary elevator system having a 1:1 roping arrangement.
Figure 1B:
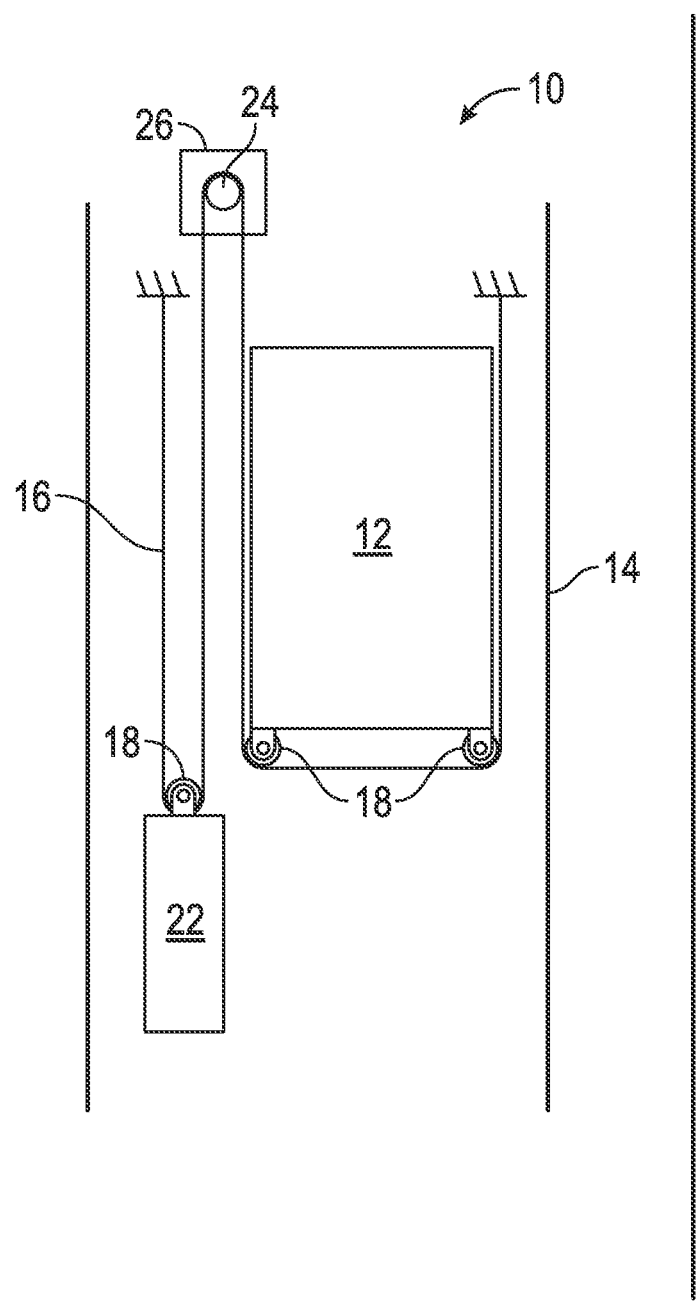
FIG. 1B is a schematic of another exemplary elevator system having a different roping arrangement.
Figure 1C:
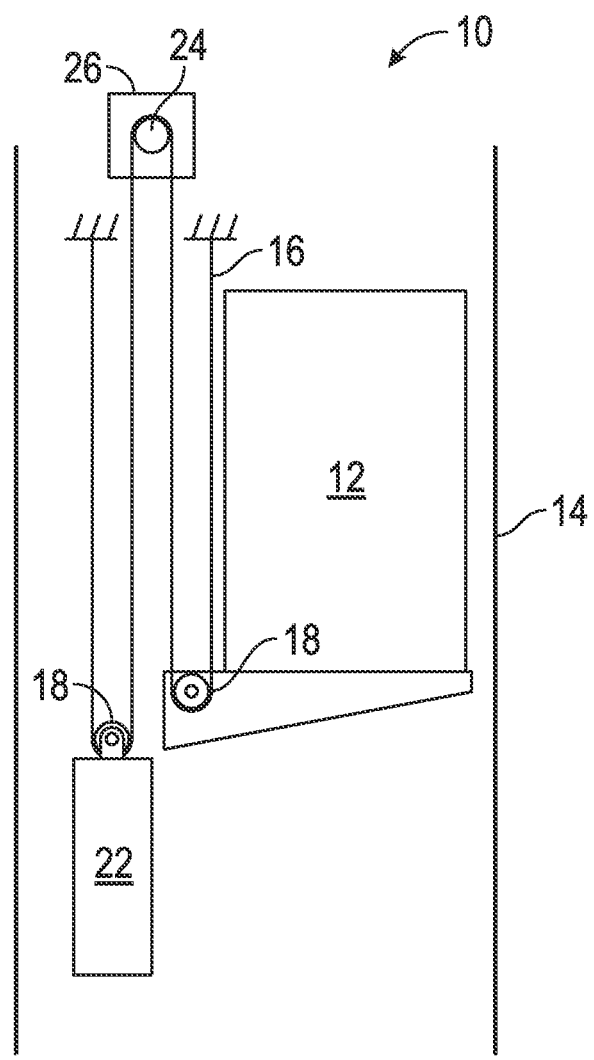
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more deflector sheaves 18 to be routed around various components of the elevator system 10. The one or more belts 16 could also be connected to a counterweight 22, which is used to help balance the elevator system 10 and reduce the difference in belt tension on both sides of the traction sheave during operation. It is to be appreciated that while the embodiments herein are described as applied to coated steel belts, it is to be appreciated that the disclosure herein may similarly be applied to steel ropes, either coated or uncoated.

The deflector sheaves 18 each have a diameter 20, which may be the same or different than the diameters of the other deflector sheaves 18 in the elevator system 10. At least one of the sheaves could be a traction sheave 24. The traction sheave 24 is driven by a machine 26. Movement of the traction sheave 24 by the machine 26 drives, moves and/or propels (through traction) the one or more belts 16 that are routed around the traction sheave 24.

In some embodiments, the elevator system 10 could use two or more belts 16 for suspending and/or driving the elevator car 12. In addition, the elevator system 10 could have various configurations such that either both sides of the one or more belts 16 engage the one or more deflector sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more deflector sheaves 18 thereon engaging the one or more belts 16 and the one or more belts 16 can terminate elsewhere, typically at a structure within the hoistway 14 (such as for a machineroomless elevator system) or within the machine room (for elevator systems utilizing a machine room). The number of deflector sheaves 18 used in the arrangement determines the specific roping ratio (e.g., the 2:1 roping ratio shown in FIGS. 1B and 1C or a different ratio). FIG. 1C also provides a cantilevered type elevator. The present invention could be used on elevator systems other than the exemplary types shown in FIGS. 1A, 1B and 1C.

Figure 2:
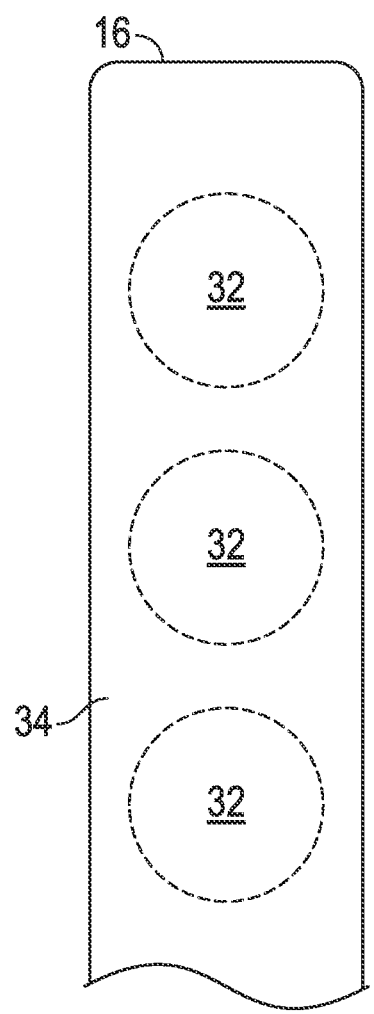
FIG. 2 is a cross-sectional view of an elevator belt.
Figure 3:
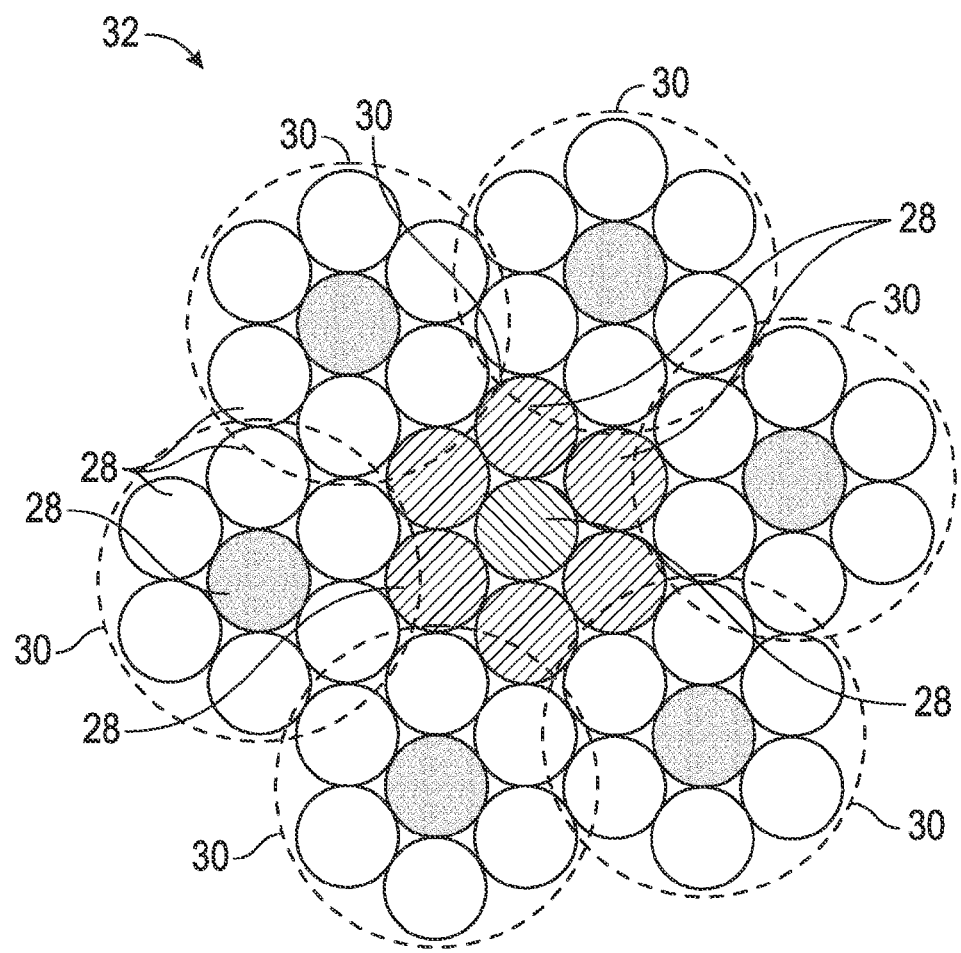
FIG. 3 is a cross-sectional view of a cord or rope.

FIG. 2 provides a schematic of a belt construction or design. Each belt 16 is constructed of a plurality of wires 28 (e.g. twisted into one or more strands 30 and/or cords 32 as shown in FIG. 3) in a jacket 34. As seen in FIG. 2, the belt 16 has an aspect ratio greater than one (i.e. belt width is greater than belt thickness). The belts 16 are constructed to have sufficient flexibility when passing over the one or more deflector sheaves 18 to provide low bending stresses, meet belt life requirements and have smooth operation, while being sufficiently strong to be capable of meeting strength requirements for suspending and/or driving the elevator car 12. The jacket 34 could be any suitable material, including a single material, multiple materials, two or more layers using the same or dissimilar materials, and/or a film. In one arrangement, the jacket 34 could be a polymer, such as an elastomer, applied to the cords 32 using, for example, an extrusion or a mold wheel process. In another arrangement, the jacket 34 could be a woven fabric that engages and/or integrates the cords 32. As an additional arrangement, the jacket 34 could be one or more of the previously mentioned alternatives in combination.

The jacket 34 can substantially retain the cords 32 therein. The phrase substantially retain means that the jacket 34 has sufficient engagement with the cords 32 to transfer torque from the machine 26 through the jacket 34 to the cords 32 to drive movement of the elevator car 12. The jacket 34 could completely envelop the cords 32 (such as shown in FIG. 2), substantially envelop the cords 24, or at least partially envelop the cords 32.

Figure 4:
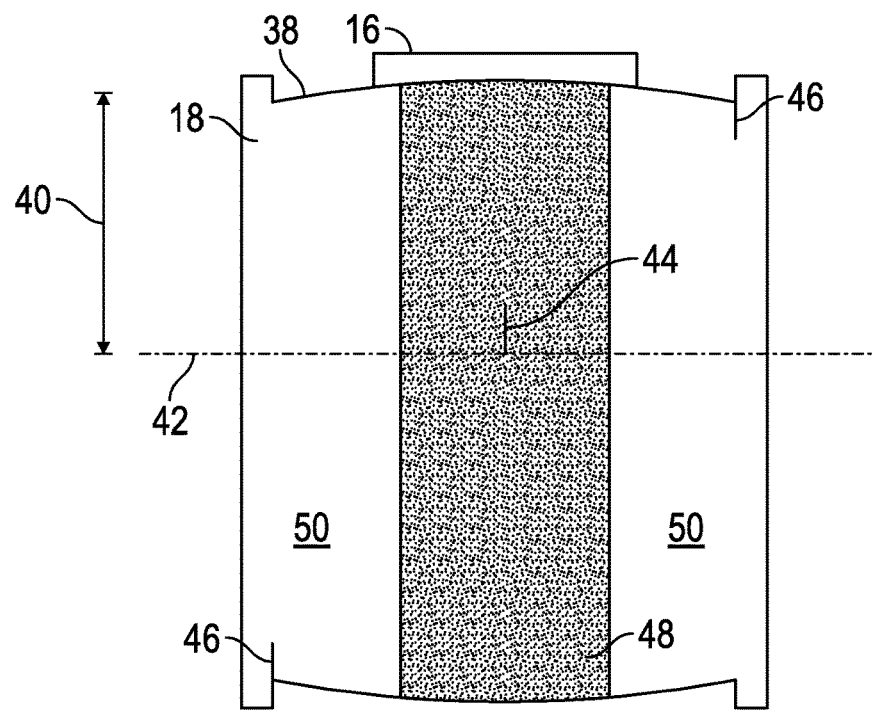
FIG. 4 is a view of an embodiment of a deflector sheave for an elevator system.

An exemplary deflector sheave 18 is shown in FIG. 4. A sheave outer surface 38 includes a crown, in some embodiments a spherical crown, such that a sheave radius 40 from a sheave axis 42 to the sheave outer surface 38 is greater at a sheave center 44 of the deflector sheave 18 than at either sheave end 46 of the deflector sheave 18. The crown configuration aids the belt 16 in being substantially centered on the sheave outer surface 38 between sheave ends 46. As stated above, however, the crown of the deflector sheave 18, in some embodiments a crown radius between 250 mm and 1000 mm, and the desire for low coefficient of friction of the deflector sheave 18 makes it difficult for the belt 16 to climb the crown of the deflector sheave 18 and remain centered.

The deflector sheave 18 is uniquely configured to address the problems noted with prior art deflector sheaves. The deflector sheave 18 includes a high friction zone 48 and one or more low friction zones 50, with the high friction zone 48 characterized as having a higher coefficient of friction than the low friction zones 50. The high friction zone 48 is located, for example, around the sheave center 44 of the deflector sheave 18, and in some embodiments includes about a center 25% to 50% of the sheave outer surface 38. The high friction zone 48 is treated by abrasive blasting or other surface treatment or coating to provide a high friction surface to effectively guide the deflector sheave 18 up the crown of the deflector sheave 18. The low friction zones 50 are located, for example, outboard of the high friction zone 48 and extend to the sheave ends 46, and in some embodiments include about the outer 25% to 40% of the sheave outer surface 38. The low friction zones 50 are characterized by having a lower coefficient of friction than the high friction sheave 48. The lower coefficient of friction in the low friction zones 50 is achieved by, in some embodiments, applying a reduced-friction coating to the low friction zones 50, for example, a Teflon nickel coating, an electroless nickel coating, a thin dense chrome coating, or a low friction plasma coating. In other embodiments, the lower coefficient of friction in the low friction zones 50 is achieved by masking the low friction zones 50 during the abrasive blast operation on the high friction zone 48. It is to be appreciated that lower coefficient of friction in the low friction zones 50 may further be achieved via other means, for example, by the use of different materials to form the low friction zones 50, relative to the high friction zone 48. In some embodiments, the high friction zones 48 are defined as having a coefficient of friction greater than or equal to 0.1, while low friction zones 50 are defined as those having a coefficient of friction of less than 0.1.

Figure 5:
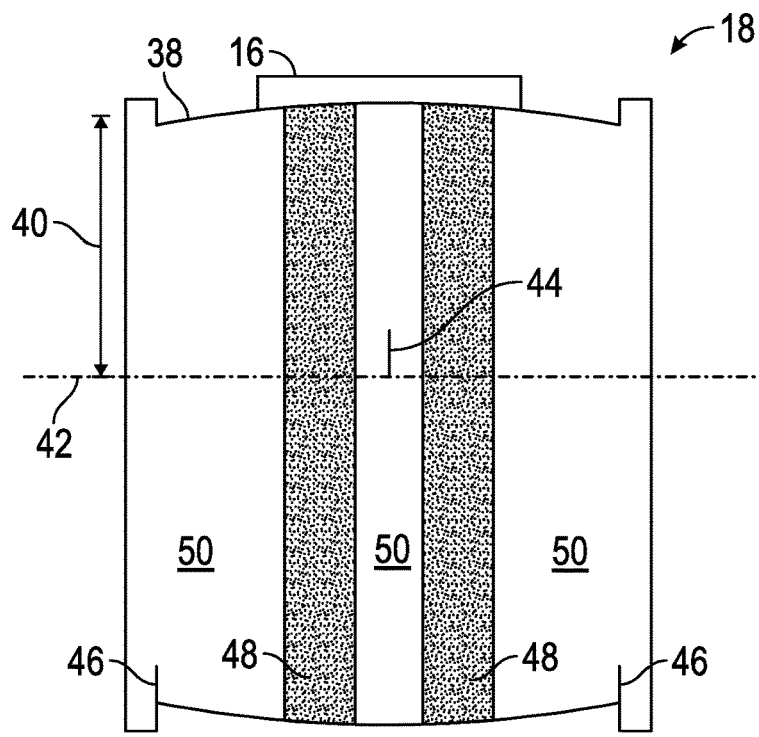
FIG. 5 is a view of another embodiment of a deflector sheave for an elevator system.
Figure 6:
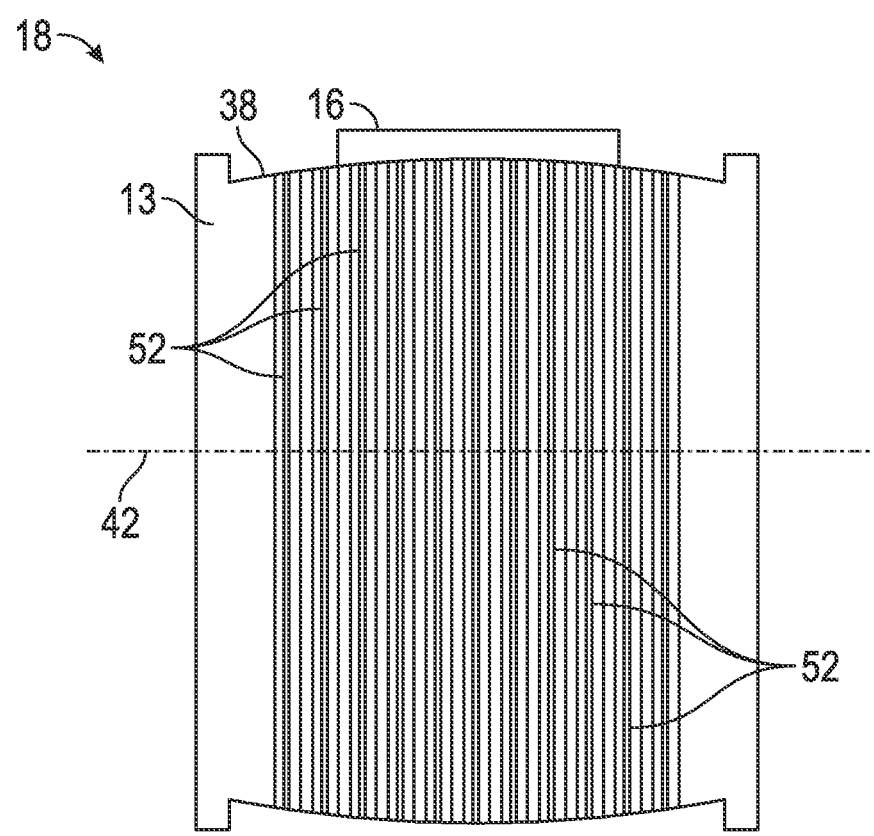
FIG. 6 is a view of yet another embodiment of a deflector sheave for an elevator system.

Referring now to FIG. 5, in some embodiments, the deflector sheave 18 includes two or more high friction zones 48 arranged as bands in the deflector sheave 18 outer surface 38. Further, in other embodiments, as shown in FIG. 6, grooves 52 are formed in the outer surface 38 by, for example, machining. In some embodiments, the grooves 52 are as wide as a cord 32 of the belt 16, are may be as small in width as 0.1 mm. A depth of the grooves 52 is determined by a depth required to introduce friction at edges of the grooves 52 between the edges of the grooves 52 and the belt 16. In some embodiments, the groove depth, measured as a radial difference between a groove peak and a groove valley is between 0.1 mm and 1.0 mm. In other embodiments, the depth is between 0.25 mm and 0.5 mm. The groove peak may be positioned either radially above, below or at the outer surface 38. In embodiments where the peak of the groove 52 is above or below the outer surface 38, a radial distance between the peak and the outer surface is about 0.1 mm maximum to maintain tension balance of the belt 16.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A deflector sheave for an elevator system comprising:
   an outer sheave surface having a distance from a sheave axis that varies along a width of the deflector sheave, the outer surface including a convex spherical crown surface, the convex spherical crown surface including:
   a first portion having a first coefficient of friction; and
   one or more second portions having a second coefficient of friction less than the first coefficient of friction, the first portion guiding an elevator belt toward a lateral center of the convex spherical crown surface;
   wherein the first portion comprises about 25% to 50% of the width of the deflector sheave.

2. The deflector sheave of claim 1, wherein the first portion is positioned at a center area of the outer sheave surface relative to the width of the deflector sheave.

3. The deflector sheave of claim 1, wherein the first coefficient of friction of the first portion is defined by an abrasive blast applied to the first portion.

4. The deflector sheave of claim 1, wherein the first coefficient of friction of the first portion is defined by a coating applied to the first portion.

5. The deflector sheave of claim 1, wherein the second coefficient of friction of the one or more second portions is defined by a coating applied to the one or more second portions.

6. The deflector sheave of claim 1, wherein the first portion and the one or more second portions are formed by machined grooves in the outer surface of the deflector sheave.

7. The deflector sheave of claim 1, wherein the convex spherical crown surface has a radius of between 250 mm and 1000 mm.

8. The deflector sheave of claim 1, wherein the first coefficient of friction is greater than or equal to 0.1.

9. A deflector sheave for an elevator system comprising:
   an outer sheave surface having a distance from a sheave axis that varies along a width of the deflector sheave, the outer surface including a convex spherical crown surface, the convex spherical crown surface including:
   a first portion having a first coefficient of friction; and
   one or more second portions having a second coefficient of friction less than the first coefficient of friction, the first portion guiding an elevator belt toward a lateral center of the convex spherical crown surface;
   wherein each second portion comprises about 25% to 40% of the width of the deflector sheave.

10. An elevator system comprising:
    an elevator car;
    a motor;
    a traction sheave operably connected to the motor to drive rotation of the traction sheave;
    a belt operably connected to the elevator car, the belt in frictional contact with the traction sheave such that rotation of the traction sheave urges movement of the elevator car; and
    one or more deflector sheaves disposed between the traction sheave and the elevator car over which the belt is routed to guide the belt to the elevator car, the one or more deflector sheaves including:
    an outer sheave surface having a distance from a sheave axis that varies along a width of the deflector sheave, the outer surface including a convex spherical crown surface, the convex spherical crown surface including:

a first portion having a first coefficient of friction; and one or more second portions having a second coefficient of friction less than the first coefficient of friction, the first portion guiding an elevator belt toward a lateral center of the convex spherical crown surface;

wherein the first portion comprises about 25% to 50% of the width of the traction deflector.

11. The elevator system of claim 10, wherein the first portion is positioned at a center area of the outer sheave surface relative to the width of the deflector sheave.

12. The elevator system of claim 10, wherein the first coefficient of friction of the first portion is defined by an abrasive blast applied to the first portion.

13. The elevator system of claim 10, wherein the first coefficient of friction of the first portion is defined by a coating applied to the first portion.

14. The elevator system of claim 10, wherein each second portion comprises about 25% to 40% of the width of the deflector sheave.

15. The elevator system of claim 10, wherein the second coefficient of friction of the one or more second portions is defined by a coating applied to the one or more second portions.

16. The elevator system of claim 10, wherein the first portion and the one or more second portions are formed by machined grooves in the outer surface of the deflector sheave.

* * * * *